Jan. 12, 1971   W. A. ROBINSON   3,555,408
METHOD AND MEANS FOR AIRBORNE ELECTROMAGNETIC EXPLORATION
UTILIZING THE RESULTANT TRANSMITTED ELECTROMAGNETIC FIELD
COMPRISED OF THE PRIMARY FIELD AND SECONDARY FIELDS
GENERATED THEREBY IN THE AIRCRAFT
Filed Dec. 9, 1968
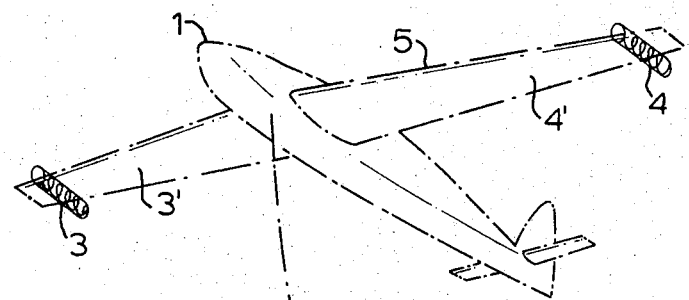
FIG.1.
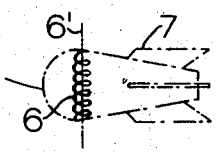
FIG.2.
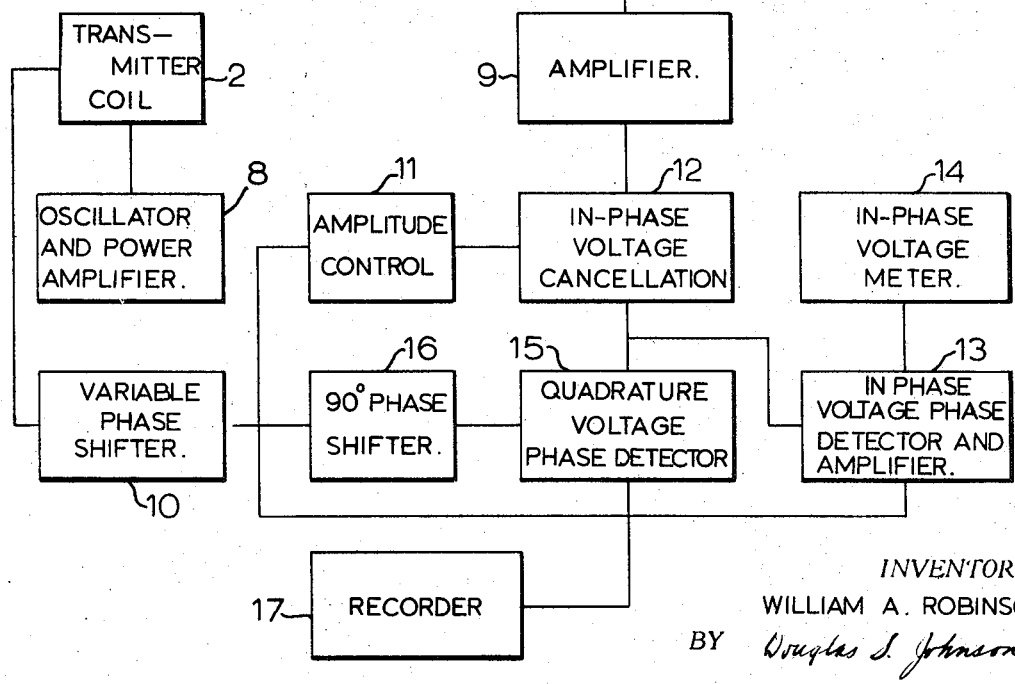
INVENTOR.
WILLIAM A. ROBINSON
BY Douglas J. Johnson

United States Patent Office 3,555,408
Patented Jan. 12, 1971

3,555,408
METHOD AND MEANS FOR AIRBORNE ELECTRO-MAGNETIC EXPLORATION UTILIZING THE RESULTANT TRANSMITTED ELECTROMAGNETIC FIELD COMPRISED OF THE PRIMARY FIELD AND SECONDARY FIELDS GENERATED THEREBY IN THE AIRCRAFT
William A. Robinson, Don Mills, Ontario, Canada, assignor to McPhar Geophysics Limited, Don Mills, Ontario, Canada
Filed Dec. 9, 1968, Ser. No. 782,272
Int. Cl. G01v 3/16
U.S. Cl. 324—4
17 Claims

ABSTRACT OF THE DISCLOSURE

A method and apparatus for airborne geophysical prospecting utilizing the detection of electromagnetic field components in quadrature with the resultant transmitted field transmitted from an aircraft which transmitted field comprises the vector sum of the primary electromagnetic field created in the transmitter in the aircraft and the secondary fields created by the linking of such primary field with the conductor components of the aircraft, the existence of field components in quadrature with such resultant transmitted field indicating the presence of a conductor anomaly outside the aircraft.

FIELD OF INVENTION

This invention relates to improvements in the method and means for carrying out airborne electromagnetic exploration or surveys for conductor anomalies.

RELATED INVENTION

A related invention is a Method and Means of Geophysical Prospecting Utilizing Combined Electromagnetic and Magnetic Time Transient Fields as disclosed in my copending application Ser. No. 782,261.

BACKGROUND OF INVENTION

In the carrying out of airborne electromagnetic exploration for conductor anomalies, a transmitter has usually been mounted in or on an aircraft and is energized by an alternating current to produce an electromagnetic field of the appropriate frequency usually in the lower audio frequency range and a receiver has been towed behind the aircraft in a "bird." In the absence of any conductor anomaly, the electromagnetic field created by the transmitter coil will induce a voltage in the receiver coil which will be proportional to the mutual coupling between the transmitter and receiver coils which in turn is dependent on the distance between the coils and their relative attitude. This mutual coupling is purely inductive and therefore the induced voltage in the receiver coil will be in phase with the electromagnetic field and hence current in the transmitting coil. If the system is brought near a conductor body such as a conducting ore body, the mutual coupling between the transmitter and receiver coils is altered and the voltage induced in the receiver coil will have an out of phase or quadrature component, and the presence of this quadrature component indicates the existence of a nearby conductor body. Unfortunately, the metal in the aircraft itself constitutes a conductor body which gives rise to an out of phase or quadrature component in the induced receiver coil voltage tending to give rise to false indications of a conducting ore body. Efforts have been made to eliminate the masking or error effect of the aircraft in the system by the use of cancelling coils such as disclosed in U.S. Pat. 2,741,736. Such coils are small transmitter coils that are supplied with current from the main transmitter. The frequency of this current is the same as that of the main transmitter coil current but the magnitude and phase of the cancelling coil current can be adjusted. By positioning the cancelling coils at suitable locations on the aircraft and supplying them with current of suitable magnitude and phase, the quadrature fields from metal parts of the aircraft can be cancelled to an acceptably low level. This method, however, invokes a laborious trial and error procedure that is very time consuming and costly.

SUMMARY OF THE INVENTION

It is the object of the present invention to essentially eliminate the effect of the aircraft on the electromagnetic system without requiring the use of such auxiliary transmitting coils or other trial and error arrangements.

In contrast to prior methods, it is the object of the invention to provide an airborne electromagnetic system which can easily and quickly be adjusted to ignore the presence of the conductive aircraft parts without requiring any of the previous trial and error procedures.

Another important object is to provide a simplified airborne electromagnetic system which will have a high degree of reliability in detecting the presence of conductor anomalies in the terrain over which the system is flown.

According to the invention the aircraft and the transmitter coil, coils or coil system are treated as a single resultant transmitting source, and the voltage induced in the receiver coil, or receiver coil system by such resultant transmitting source is cancelled or reduced to a minimum by means of a reference voltage obtained from the transmitting coil but varied in phase and amplitude to effect such cancellation of the induced receiver voltage.

BRIEF DESCRIPTION OF DRAWINGS

The invention will be more fully understood with reference to the following detailed description, taken in conjunction with the accompanying drawings in which, FIG. 1 is a diagrammatic view showing the preferred coil arrangement for an airborne electromagnetic system according to the invention.

FIG. 2 is a block diagrammatic view of an airborne electromagnetic system embodying the invention.

DETAILED DESCRIPTION OF INVENTION

Basically, all electromagnetic methods used in locating conductor bodies such as conductor ore bodies detect the presence of electrically conductive material by measuring the change that takes place in the mutual coupling between two coils when the coils are brought near the conductive material.

It will be understood that if two coils are located in free space, the coupling between them is purely inductive. The magnitude of the coupling depends on their relative attitude and on the distance between them. If one of the coils is made to carry an alternating current it becomes a transmitter coil and will create an electromagnetic field which in turn will induce a voltage in the second or receiver coil proportional to the mutual coupling between the coils. Since this mutual coupling is purely inductive the induced voltage must be in phase with the electromagnetic field and hence with the current in the transmitting coil. The magnitude of the induced voltage will change if the distance between the coils changes or if their relative attitude changes, but the phase will not change with these variables.

If the coil system is brought near a mass of conductive material, this material will introduce an additional coupling between the coils. Any practical conductor will have inductance dependent on its size and permeability, and resistance dependent on its size and conductivity. Thus the coupling introduced into the system by such a conductor is of a complex nature and the additional voltage induced in the receiver coil will, therefore, have both an in phase and an out of phase or quadrature component. It will be noted that a quadrature component can only be introduced by a conductor and not by a change of initial coupling of the coil system.

Airborne electromagnetic systems make use of this principle. The transmitter coil or, if desired, coils are mounted on the aircraft and the receiver coil or, if desired, coils are located in a towed bird. Obviously, the distance between the coils and their relative attitude can change during flight. Thus the in phase component of the voltage generated in the receiver coil can change when no conductor is present so that measurements of this component could falsely indicate an anomaly. But a quadrature component can only be introduced by a conductor and this is the response that is particularly looked for and recorded.

By recording only the quadrature component of the response, the system is made largely independent of changes in the initial coupling as explained above. Nevertheless, it is desirable to limit large increases of the normally detected in phase voltage. This requirement is to prevent overload of the various electronic circuits which, if permitted, could cause small phase shifts and hence false responses. For this reason the transmitter and receiver coils are preferably oriented in a maximum coupled relationship so that if their relative attitude shifts somewhat the in phase voltage will not swing widely and in fact will decrease rather than increase.

It will be understood that the aircraft itself with its metal skin constitutes a fairly large conductor within the coil system. The aircraft will, therefore, give rise to both an in phase and a quadrature voltage in the receiver coil. This effect will be understood from the fact that when the transmitter coil carried in the aircraft is energized by an alternating current from a suitable source at an appropriate frequency normally in the audio frequency range and usually say from the order of a few cycles up to about 2,000 to 3,000 cycles per second, it will create a primary electromagnetic field of corresponding frequency. This primary field will induce currents in metal parts of the aircraft which in turn produce secondary electromagnetic fields. Thus there are several sources of radiated field, the primary one being from the transmitter coil and the secondary sources from metal parts of the aircraft. These transmitted fields all have the same frequency but they will not have the same phase.

In an effort to eliminate the present trial and error problems of attempting to cancel out in the aircraft the effect of these secondary sources the effect of the combined fields at the receiver coil was investigated and it was discovered that the aircraft and the transmitter coil combined could be considered as a single resultant transmitter creating an electromagnetic field having the same frequency as the primary field but having a phase out of phase with the primary field to a degree determinned by the conductive characteristics of the aircraft and the relation of the transmitter coil thereto.

This resultant effect can be explained as follows: Since the bird carrying the receiver coil is towed below and behind the aircraft at a radial distance of some 400 to 500 feet the distance between the receiver coil and the aircraft is many times the greatest dimension of the transmitter coil, the greatest dimension of the secondary sources and the distance between any of the sources. Under this condition and to a first approximation, the sources may be considered as sources located at the same point. The resultant field produced by the sources at the receiver coil is the vector sum of the fields at that point produced by the various sources. Under the above conditions this resultant field can be considered as being produced by a single source whose magnitude and phase are defined by this vector sum. Thus it is possible to consider the combination of the transmitter coil and the metal parts of the aircraft as a single transmitting source producing a single resultant field at the receiver coil of some unknown phase and amplitude which however can be determined as hereinafter set out.

In the usual electromagnetic system the quadrature component introduced by a conductor whose presence it is desired to detect is measured relative to the field produced by the transmitter coil. That is, the component of the received voltage at 90 degrees to or in quadrature with the field from the transmitter coil is taken to indicate the presence of a conductor. If instead of this, in accordance with the invention the component of the received voltage at 90 degrees to the resultant field is used, the problem of secondary fields from metal parts of the aircraft is overcome without employing auxiliary coils or other means to cancel them out.

In the foregoing, it was considered that the transmitter sources were located at the same point. If an extremely high degree of measuring accuracy is required or if the receiving coil must be located close to the aircraft this assumption may not be valid. However, in a typical system operated on a Beaver aircraft with the receiver coil towed approximately 400 feet from the aircraft, it was found that the assumption was a valid one to the extent that a measuring accuracy of better than 1 part in 2000 was obtainable.

It has further been found that the accuracy obtainable from the above method can be increased by minimizing the effect of a magnitude of the currents induced in metal parts of the aircraft. To this end, it has been found that the effect of such currents can be minimized by locating the transmitter coil or coil systems symmetrically with respect to the aircraft frame. According to one simple embodiment of the invention two transmitter coils connected in series are used and located symmetrically one on each wing of the aircraft with their axes either perpendicular or parallel to the length of the wing. It has also been found that an actual reduction of the induced currents may be obtained by employing cores of high permeability and supporting the coils below or above the aircraft wings as far as practical from the wings and with the axes of the coils perpendicular to the wings and the coil ends extending a foot or so beyond the edges of the wings.

With reference to FIG. 1, the aircraft shown diagrammatically at 1 is provided with a "transmitter coil" designated in block form at 2 in FIG. 2 constituted by a pair of coils 3 and 4 shown diagrammatically in FIG. 1 connected in series and located at the opposite ends 3' and 4' of the wings 5 of the aircraft with their axis horizontal. Preferably these coils 3 and 4 extend beyond the edges of the wings 5 of the aircraft and preferably they are also spaced either above or below the wings as far as practical to reduce the coupling with metal parts of the aircraft as explained above. It will also be apparent that splitting the transmitter coil into the two coils segment 3 and 4 provides symmetrical weight balance as well as electrical coupling balance.

The receiver is represented for simplicity as a single coil 6 shown physically oriented with its axis vertical but it will be understood that the receiver may in fact be constituted by at least a pair of physical coils whose voltages can be combined to provide an equivalent coil giving identical output voltages as the single physical coil 6 as explained in co-pending application Ser. No. 782,261 entitled Method and Means of Geophysical Prospecting Utilizing Combined Electromagnetic and Magnetic Time Transient Fields.

This physical or equivalent receiver coil 6 is carried in a bird designated at 7 carried at the end of a suitable tow line. In practice the bird 7 carrying the receiver coil 6 is towed to fly below and behind the aircraft 1 at a radial distance of between approximately 300 to 500 feet and at an angle of approximately 54 degrees from the horizontal.

It is desirable, as explained above to have the receiver coil 6 in a position of maximum coupling and therefore it is mounted in the bird so that its axis 6' is vertical as shown in FIG. 1 when in flight.

As will be understood it is now known that there exist naturally occurring random or transient electromagnetic fields having electric and magnetic components. The transient magnetic components or fields (the AFMAG fields) of the transient electromagnetic fields are known to be normally horizontal so that it is a further advantage to have the axis of the receiver coil constituted either by the physical or equivalent coil vertical to minimize any induced voltage in the receiver coil created by the normally horizontal AFMAG fields.

With reference to FIG. 2 it will be seen that the transmitter 1 is energized by means of an oscillator and power amplifier designated at 8 to create an alternating current in the coil elements 3 and 4 which in turn gives rise to a primary field radiated by the coils, the primary field having a frequency as determined by the selected oscillator frequency and this field will be in phase with the alternating current fed to the coils. This primary field will give rise to auxiliary secondary fields due to the currents induced in the metal parts of the aircraft by the radiated primary field and as explained, these secondary fields will have the same frequency as, but a different phase than the primary field. The vector sum of these fields will produce a resultant "primary" or transmitted field having the same frequency as, but a different phase than the field radiated by the coils 3 and 4. This resultant primary field will link with the receiver coil inducing a voltage in the receiver coil which will be of the same frequency and phase as the resultant primary or transmitted field. The voltage or signal generated in the receiver coil 4 is amplified by amplifier 9 and fed up to the aircraft where direct pick up of the resultant transmitted field is cancelled to zero or a minimum by a reference voltage delivered from the transmitter coil through a variable phase shifter 10 and an amplitude control circuit 11 in an in-phase voltage cancellation circuit 12. Any uncancelled signal in phase with the resultant transmitted field delivered from the receiver is fed to an in-phase voltage phase detector and amplifier 13 which receives an appropriate reference voltage from the variable phase shifter 10. The output of the detector 13 is then measured or recorded on an inphase voltage meter 14. Any voltages or signals out of phase or in quadrature with the resultant primary or transmitted field are fed through the in-phase voltage cancellation circuit 12 to a quadrature voltage phase detector 15 which receives an appropriate reference voltage from the variable phase shifter 10 through a 90° phase shifter 16. The output of the quadrature voltage phase detector is then fed to a recorder 17. Since the system requires the cancellation of the direct pick up of the resultant transmitted field to zero or a minimum, it will be understood that it is necessary to adjust the system preparatory to carrying out a survey since the phase and amplitude of the resultant primary or transmitted field is unknown. To effect this adjustment the aircraft is flown at a height where it will be isolated from all extraneous conductors in the ground. Under this condition only the conductor portions of the aircraft will give rise to any field components out of phase or in quadrature with the primary field created in the transmitter. Thus if the system is adjusted to reduce the quadrature component reading in the recorder 17 to zero or a minimum then the system will be adjusted to detecting signals in phase or 90° out of phase with the resultant transmitted field and not with the primary field in the transmitter coil per se. This adjustment of the system is obtained by adjusting the variable phase shifter 10 to obtain a zero or minimum reading in recorder 17. Since as explained, it is desired to cancel out direct pick up of the resultant transmitted field in the receiver, this cancellation is effected by adjustment of the amplitude control 11 to give a minimum reading in the in-phase voltage meter 14 the out of phase adjustment having been made by the phase shifter 10 as explained. It will be understood that cancellation of the direct pick up voltage should also be possible by simply adjusting the phase shifter 10 and amplitude control 11 for zero or minimum reading of the in-phase voltage meter 14. Such cancellation would be accurate if the receiver and transmitter coils could be maintained constant in relative attitude. However, because in any practical system the relative movement of the receiver and transmitter causes a change in coupling, it is difficult to get a precise cancellation of the resultant field by measurement of the in-phase voltage at meter 14. Since, however, such relative change in transmitter receiver attitude in flight does not introduce any quadrature component, if the system is adjusted to give a zero or minimum in the quadrature voltage phase detector 15 as determined by the recorder 17, the system will be at the proper adjustment ready to detect any field components in quadrature with the resultant transmitted field. The minimum recorded by the in-phase voltage meter 14 will also properly reflect the optimum cancellation of the in phase component of the resultant transmitted field.

In carrying out electromagnetic exploration, the aircraft is flown at a low altitude over the ground and the resultant transmitted or "primary" field cuts a surface or a subterranean conductor mass such as an ore body and will induce currents in such mass giving rise to a secondary electromagnetic field of the same frequency as the resultant transmitted field but which has components which are both in phase and out of phase with the resultant transmitted field. These secondary fields in turn induce voltages or signals in the receiver coil or coil system which are of the same frequency and phase as the secondary fields. It is primarily the out of phase or quadrature voltages or signals which are significant in the detection of such conductor masses because as mentioned these signals cannot be caused by any change in relative attitude of the transmitter and receiver coils which change would give rise to in phase signals at the meter 14 and give a false indication of a conductor body. The quadrature signals hence must be caused by the existence of a conductor body outside the aircraft and transmitter and receiver systems.

The quadrature voltage is detected and recorded on the recorder 17 which provides a record of the presence and magnitude of the quadrature voltage from point to point as the aircraft flys over the area being surveyed. The recorded results therefore will give an indication of the presence and extent of the influencing conducting geophysical anomaly.

While the preferred embodiment of the invention has been described it will be understood that various modifications and alterations may be made without departing from the spirit of the invention or scope of the appended claims.

I claim:

1. A method of geophysical prospecting from an aircraft comprising creating a primary electromagnetic field of a predetermined frequency at the aircraft giving rise to secondary fields in conductive parts of the aircraft of the same frequency as, but of different phase than said primary field, which secondary fields produce with said primary field a resultant transmitted field of the same frequency as but out of phase with said primary field and detecting at a point remote from the aircraft any electromagnetic field component 90° out of phase with said resultant transmitted field.

2. A method as claimed in claim 1 in which direct pick up of said resultant transmitted field at said point remote from the aircraft is at least substantially cancelled out.

3. A method as claimed in claim 2 in which any electromagnetic field components in phase with said resultant transmitted field are also detected at said point remote from the aircraft.

4. A method as claimed in claim 3 comprising the further step of recording at least any detected electromagnetic field components 90° out of phase with said resultant transmitted field.

5. A method of electromagnetic prospecting from an aircraft, comprising creating a primary magnetic field of a predetermined frequency, giving rise to secondary electromagnetic fields in conductor parts of the aircraft of the same frequency as, but having components 90° out of phase with said primary field producing an effective resultant transmitted field of the same frequency as but of a different phase than said primary field, detecting any electromagnetic field components 90° out of phase with said resultant transmitted field created by said transmitted field linking with a conductive body over which the aircraft may fly at a point remote from the aircraft while at least substantially cancelling out direct pick up of said transmitted field at said point.

6. A method as claimed in claim 5 in which there is further detected at said point any electromagnetic field components in phase with said transmitted field created by said transmitted field linking with a conductive body over which the aircraft may fly.

7. Apparatus for conducting airborne geophysical surveys comprising transmitter coil means mounted on an aircraft, means for energizing said transmitter coil to create a primary electromagnetic field of predetermined frequency, a receiver coil means mounted in a bird to be towed behind the aircraft, a cancellation circuit, means for feeding voltages generated in said receiver coil upon energization of said transmitter coil to said cancellation circuit, a variable phase shifter variable over a continuous range; means to feed a reference voltage of the same frequency and phase as said primary electromagnetic field to said variable phase shifter, an amplitude control circuit connected to the output of said variable phase shifter, means for applying the output of said amplitude control circuit controllable in phase and amplitude to said voltage cancellation circuit to cancel to a minimum in said cancellation circuit voltage fed from said receiver coil when said aircraft and bird are remote from any extraneous conducting bodies, and means for detecting any voltage generated in said receiver coil means in 90° phase relation to the voltage delivered from said amplitude control circuit to said voltage cancellation circuit to effect such cancellation of voltage from said receiver coil.

8. Apparatus as claimed in claim 7 in which said transmitter coil means and said receiver coil means are oriented for maximum mutual coupling in flight.

9. Apparatus as claimed in claim 8 in which said transmitter coil means comprises a pair of coils connected in series and arranged one adjacent each end of the wings of the aircraft.

10. Apparatus as claimed in claim 9 in which said transmitter coils are arranged with their axes substantially horizontal.

11. Apparatus as claimed in claim 10 in which said transmitter coils are arranged with their axes spaced from the wings of the aircraft.

12. Apparatus as claimed in claim 10 in which said receiver coil means comprises a coil mounted so that its axis assumes a substantially vertical position in flight.

13. Apparatus as claimed in claim 10 in which said receiver coil means comprises as equivalent single coil having its axis substantially vertical in flight.

14. Apparatus as claimed in claim 7 in which said means for detecting any receiver coil means voltage in said 90° phase relation comprises a quadrature voltage detector and a 90° phase shifter is provided to deliver a reference voltage to said quadrature voltage detector from said variable phase shifter.

15. Apparatus as claimed in claim 14 in which means are provided to record any output of said quadrature voltage detector.

16. Apparatus as claimed in claim 15 in which means are provided to detect any voltage output of said voltage cancellation circuit in 90° phase relation with the voltage detected by said quadrature voltage detector.

17. Apparatus as claimed in claim 16 in which means are provided to record any voltage detected by said last mentioned detecting means.

References Cited

UNITED STATES PATENTS

| | | | |
|---|---|---|---|
| 2,887,650 | 5/1959 | Ruddock et al. | 324—4XR |
| 2,929,984 | 3/1960 | Puranen et al. | 324—4XR |
| 2,995,699 | 8/1961 | Snelling et al. | 324—4 |
| 3,014,176 | 12/1961 | McLauglin et al. | 324—4 |
| 3,029,380 | 4/1962 | Nicol | 324—40XR |
| 3,065,407 | 11/1962 | Huddleston et al. | 324—6 |
| 3,108,220 | 10/1963 | Ruddock | 324—4XR |
| 3,127,557 | 3/1964 | Gribble et al. | 324—4 |

GERARD R. STRECKER, Primary Examiner

U.S. Cl. X.R.

324—6